United States Patent [19]
Matsushita et al.

[11] 3,827,000
[45] July 30, 1974

[54] OPTICAL MODULATOR
[75] Inventors: Shigeo Matsushita; Atsufumi Ueki; Motoaki Furukawa, all of Tokyo, Japan
[73] Assignee: Nippon Selfoc Company Limited, Tokyo, Japan
[22] Filed: Jan. 30, 1973
[21] Appl. No.: 328,009

[30] Foreign Application Priority Data
Feb. 1, 1972    Japan.............................. 47-11929

[52] U.S. Cl..... 332/7.51, 331/94.5 M, 350/96 WG, 350/160 R, 350/175 GN
[51] Int. Cl............................................. H01s 3/10
[58] Field of Search............ 332/7.51; 331/94.5 M; 350/96 WG, 160 R, 150, 175 GN; 250/199

[56] References Cited
UNITED STATES PATENTS
1,974,067   9/1934   Gray................................... 350/150
3,329,474   7/1967   Harris et al......................... 350/150
3,331,651   7/1967   Sterzer................................ 332/7.51
3,393,954   7/1968   Endarby et al..................... 350/150

OTHER PUBLICATIONS
Uchida et al., "Optical Characteristics of Light Focusing Fiber Guide . . " 10/70, pg. 606–612, IEEE, J.Q.E., Vol. QE–6, No. 70.
Biazzo, "Fabrication of $LiTaO_3$ . . . Optical Modulator," 5/71, pg. 1016–1020, Applied Optics, Vol. 10, No. 5.

Primary Examiner—Richard A. Farley
Assistant Examiner—N. Moskowitz
Attorney, Agent, or Firm—Sandoe, Hopgood & Calimafde

[57] ABSTRACT
An optical modulator includes plural cascaded electrooptic crystals to effect optical amplitude or phase modulation. Transparent focusing light guides with a varying refractive index are disposed on the optical axis between adjacent crystals, such that the composite modulator exhibits improved sensitivity and bandwidth characteristics.

1 Claim, 2 Drawing Figures

OPTICAL MODULATOR

DETAILED DESCRIPTION OF THE INVENTION

This invention relates to an optical modulator and, more particularly, to an optical modulator of the type employing a crystal with a large electrooptic effect which is characterized by improved modulation efficiency and modulation sensitivity.

The remarkable progress achieved in recent years in laser technology has resulted in active research and development directed to an optical communication system, a laser beam being modulated to transmit signals. Increasingly higher performance has been required for an optical modulator which is an important constituent of such a system. The optical modulator typically employs crystals characterized by a high electrooptic effect for their high efficiency and sensitivity, and a variety of crystals such as $LiTaO_3$ and $KD_2PO_4$ have come into use.

Prior-art high-sensitivity optical modulators generally employ only a single piece of such an electrooptic crystal. Even where a plurality of such crystals are employed, they are usually arranged in cascade.

To increase the efficiency and sensitivy of optical modulation, the electrooptic crystal must be long in the direction of light wave travel or, otherwise, small in its diameter. However, the modulator has a lower limit for its diameter to permit the laser beam to travel therethrough, thus establishing a lower limit for the size of the modulator crystal.

Electrooptic crystals of considerable thickness and length are required to increase modulation sensitivity. On the other hand, modulation bandwidth is inversely proportional to the total electric capacity of the optical modulator. Therefore, high-efficiency optical modulation is usually accompanied by narrowed bandwidth. It is accordingly impossible with conventional structures to increase sensitivity and bandwidth at the same time.

It is thus an object of the present invention to provide an optical modulator which is free from the abovedescribed disadvantage; which is adapted for miniaturization; and which is mechanically stable due to the use of a focusing light guide combined with modulation crystals.

An optical modulator according to the present invention includes a focusing light guide having a focusing characteristic such that light rays travelling through the optical modulator propagate therethrough without any substantial divergence. A light beam passing through the electrooptic crystal can be made narrow owing to the focusing action of the light guide, so that the modulation crystal can be made relatively small to increase modulation sensitivity accordingly. The crystal need not be lengthened, so that the modulation bandwidth is not decreased.

It is also possible to broaden the bandwidth of the optical modulator without affecting modulation sensitivity. Furthermore, the focusing light guide has end surfaces disposed perpendicular to its center axis, so that its preparation and the cascade connection of the guide with the electrooptic crystal are facilitated, making it possible to realize a small-sized optical modulator of mechanically stable construction.

A light guide having focusing properties allows the light beam to travel along its axis. Such light guide, in its cross-section perpendicular to the axis, has a refractive index gradient which gradually decreases from the central portion towards its periphery. A light beam incident at the input end surface of such a focusing light guide travels therethrough without dissipation through the side surfaces thereof. Moreover, the focusing light guide is equivalent in its focusing function to an array of lenses, as described in *The Bell System Technical Journal*, March issue, 1965, pp. 455–494.

The focusing light guide employed in the present invention is made of a glass body containing monovalent positive metal ions. It is manufactured by an ion-exchange process in which the glass body is held in contact with a molten salt containing monovalent positive ions which contribute less to the refractive index of the glass body than the positive ions originally contained in the glass body. Thus, a portion of the latter-mentioned positive ions are replaced by the positive ions contained in the molten salt. This mades the refractive index of the glass body smaller in the vicinity of its surface than in the central portion. The method for manufacturing the glass body is described in detail in Japanese Pat. application No. 16986/1968, and further explanation is not required and will not be given here.

In order that this invention may be readily understood, the mode transformation of a light beam by the focusing light guide will be first described.

According to a paper by H. Kogelnik and T. Li published in the *Proceedings of the IEEE*, October issue, 1966, pp. 1312–1329, a focusing light guide, as above described, of a length $l$, having a varying refractive index $n$ given by $$n = n_0 (1 - \tfrac{1}{2} a r^2) \qquad (1)$$

[where $n_0$ indicates a refractive index on the center axis; $a$ is a constant determining the refractive index gradient; and $r$ is the distance across the guide cross-section as measured from the center axis (for brevity, Equation (1) is expressed by transforming an equation in the cited paper—accordingly, the following equations are in a form modified to not be inconsistent with Equation (1))] is placed at a distance $Z$ from the beam waist of a light beam (at this point, the radius of curvature and the spot size of the beam being $R_1$ and $w_1$, respectively), and when the axis of the light path formed in the transparent body is set to agree with the light beam axis, then the radius of curvature $R_2$ and the spot size $w_2$ of the light beam observed immediately after emerging from the end surface of the focusing light guide are given by the following equations:

$$q_2 = A\, q1 + B/C\, g_1 + D \qquad 2$$

where $q_1$ and $q_2$ are termed the complex beam parameters of the light beam at the input and emergent end surfaces, respectively, and are represented by $$\left. \begin{array}{c} 1/q_1 = 1/R_1 - j\, 1 S_1 \\ q_1 = j\, S_0 + Z \\ \text{and} \\ 1 q_2 = 1/R_2 - j\, 1/S_2 \end{array} \right\} \qquad 3$$

where $S_{0,1,2} = \pi w^2_{0,1,2}/\lambda$ and $w_0$ is the spot size observed at the waist of the incident beam. A, B, C and D are the elements of the ray transfer matrix of the focusing transparent body, wherein:

$$\begin{vmatrix} A & B \\ C & D \end{vmatrix} = \begin{vmatrix} \cos\sqrt{a}l & \dfrac{1}{\sqrt{a}n_0}\sin\sqrt{a}l \\ -\sqrt{a}n_0\sin\sqrt{a}l & \cos\sqrt{a}l \end{vmatrix} \quad (4)$$

According to a paper by I. P. Kaminow and E. H. Tarner published in the Proceedings of the IEEE, October issue, 1966, pp. 1,374-1,390, the spot size observed at the beam waist of a light beam passing through a substance of a refractive index $n$ and a length L and that at both extremities of the length L under minimum diffraction loss are respectively represented by $$w_0 = \sqrt{\lambda L/2 n} \text{ and } w = \sqrt{2}\, w_0.$$

(5)

It is stated that this light beam is equivalent to one in a vacuum whose spot size viewed at the beam waist is $w_0 (= \sqrt{\lambda L/2 n})$ and whose spot size at a distance of $$L/2n - S_0$$

(6)

from the beam waist is $\sqrt{2}\, w_0$.

Therefore, in a modulating element having a plurality of electrooptic crystals of refractive index $n$ and length L, and focusing light guide pieces each interposed between neighboring ones of the electrooptic crystals having a refractive index expressed by Equation (1), with their center axes aligned into a common straight line and with the input and output end surfaces of each element kept in close contact with one another, the length $l$ of each focusing light guide piece for optimizing the diameter of the light beam within each one of the modulating crystal is given by the following Equation (7) by replacing Z and $S_2$ is Equation (3) with $S_0$ and 2 $S_0$, respectively, and thereafter substituting the equation together with Equation (4) into Equation (2):

$$l = \dfrac{\tan^{-1}\left[\dfrac{2S_0\sqrt{a}n_0}{2S_0^2 a n_0^2 - 1}\right] + N\pi}{\sqrt{a}} \quad (7)$$

where N is an integer.

Further, the maximum spot size of the light beam travelling through the light guide piece can also be evaluated from Equation (2), as follows:

$$w_{max} = \sqrt{\dfrac{\lambda}{2S_0}(2S_0^2 + S_e^2 + \sqrt{4S_0^4 + S_e^4})} \quad (8)$$

where $$S_e = \dfrac{1}{\sqrt{a}n_0}$$

In the case where N in Equation (7) is zero, the maximum spot size appears at the central part of the light guide piece.

This invention will now be described with reference to the accompanying drawing, wherein.

Figure 1:
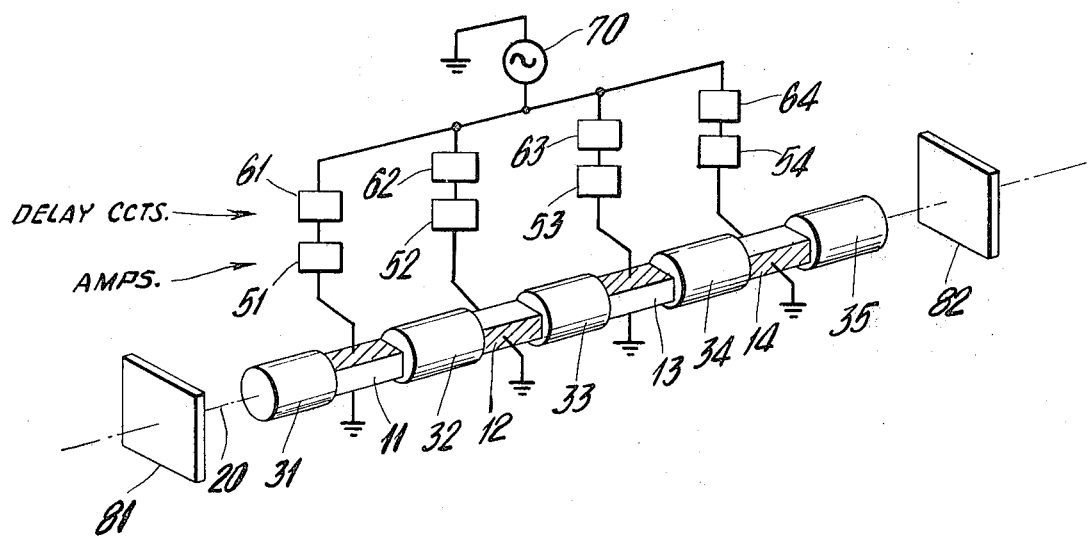
FIG. 1 is a perspective view of an embodiment of the present invention.

In the drawings, there is shown rectangular parallelepiped LiTaO$_3$ crystals 11, 12, 13 and 14 with the length, thickness and width of each being oriented in the a-, c- and y-axis directions; with the a-plane subjected to mirror polishing; while electrode films are attached to the c-planes. The length of the crystals 11, 12, 13 and 14 is 1 mm. The c-axes of every two neighboring crystals are arranged at right angles with each other so that the temperature dependence of the birefringence inhering to these crystals may be compensated, which tends to cause fluctuation in modulation sensitivity. The length L of each of the crystals 11, 12, 13 and 14 is fixed at 1 mm, as described above. When the wavelength λ of the light beam employed is 1.064 microns, the spot size viewed at the beam waist and that at the end surfaces of the individual crystals become 9.0 microns and 12.7 microns from Equation (5), respectively. (The refractive index $n$ of the LiTaO$_3$ crystal at the wavelength of 1.06 microns is 2.14.)

The thickness and width of the crystals are 80 microns, approximately three times as large as the beam diameter viewed at the end surfaces (approximately six times as large as the spot size). Since the half-wave field-distance product of the LiTaO$_3$ crystal for the 1.06 micron laser light rays, $[E \cdot l]\lambda/2$ is 4,630 V, a half-wave voltage required for 100% amplitude modulation of the optical modulator of the present embodiment is $[E \cdot l]\lambda/2 \times 0.08/(1 \times 4) \approx 93$ V.

Focusing light guide pieces 31, 32, 33, 34 and 35 of equal length are each cut perpendicular to the center axis thereof and are subjected to mirror polishing at their end surfaces. The refractive index $n_0$ and the constant $a$ in Equation (1) are 1.60 and 0.5 mm$^{-2}$, respectively. Their center axes are on the axis 20 of the propagation of the light beam. As shown in the drawing, the focusing light guide pieces 31, 32, 33, 34 and 35 are arranged so that their input and output end surfaces may be kept in close contact with the crystals 11, 12, 13 and 14. The length $l$ of each of the focusing light guide pieces 31, 32, 33, 34 and 35 is determined from Equation (7) to be 3.0 mm. If follows therefore that the spot size $w_0$ viewed at the beam waist in the crystals 11, 12, 13 and 14 is 9.0 microns as previously stated, so that $l = 3.0$ mm is obtained from Equation (7) at $N = 0$. Further, a value of approximately 35 microns is obtained from Equation (8) as the maximum spot size in the focusing light guide piece. The diameter of the individual focusing light guide pieces is 200 microns, approximately three times as large as the maximum diameter of the light beam.

Figure 2:
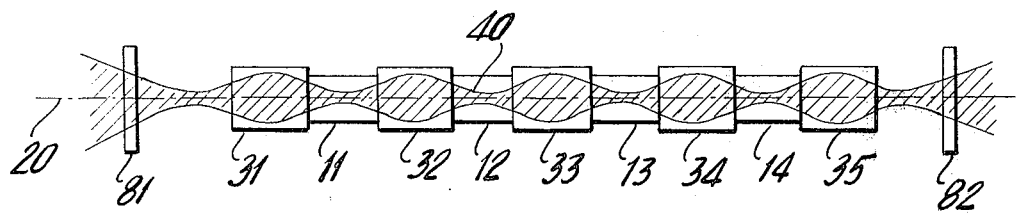
FIG. 2 shows a longitudinal section of the embodiment of FIG. 1.

When a laser beam of wave-length 1.06 microns with a spot size of 9.0 microns viewed at the beam waist appearing at a point $L/2n = 0.23$ mm apart from the focusing light guide piece 31 is incident upon the optical modulator from the left-hand side of the focusing light guide 31, the light beam is transmitted as an optimum light beam through the crystals 11, 12, 13 and 14 by virtue of the focusing light guide pieces 31, 32, 33 and 34, as is illustrated by a hatched portion 40 in FIG. 2.

Amplifiers 51, 52, 53 and 54 are connected to the electrodes of the crystals 11, 12 13 and 14, respectively. Delay circuits 61, 62, 63 and 64 connect to a common signal power source 70. A polarizer 81 and an analyzer 82 are are arranged with their optical axes lying at a right angle with each other and with angles of +45° (or =45°) and −45° (or 30 45°) formed with the c-axis of the crystal 11.

Description will now be given of the modulating operation of the optical modulator comprising the constituent elements stated above.

When the laser beam of wavelength 1.06 microns and 9.0 microns in spot size viewed at the beam waist lying at the point 0.23 mm apart from the focusing light guide piece 31 impinges on the polarizer 31, it is converted into linearly polarized light rays and travels through the focusing light guide piece 31. As previously stated, the laser beam travels through the crystals 11, 12, 13 and 14 in the form of an optimum beam. Meanwhile, a voltage generated in common at the signal source 70 is applied through the delay circuits 61, 62, 63 and 64 and amplifiers 51, 52, 53 and 54 to the crystals 11, 12, 13 and 14. Electrodes are provided on the c-planes of each of these crystals for the application of the amplified voltage to the crystals. Therefore, the laser beam has its phase change increased upon passage through each one of the modulation crystals, and is thus subjected to polarization modulation. The laser beam emerging from the focusing light guide piece 35 is converted into light amplitude-modulated when viewed at the output of the analyzer 82.

While the optical modulator of the present embodiment is suitable for optical modulation, especially at high frequencies, it is to be understood that optical modulation can also be effected without the amplifiers 51, 52, 53 and 54 and the delay circuits 61, 62, 63 and 64. In such an arrangement a signal voltage may be applied from the signal source 70 through a single amplifier to the respective crystals.

It is observed, for completeness, that the end surfaces of the crystals and the focusing light guide pieces include anti-reflection coatings. Further, all the members of the instant modulator need not be kept in alignment and in close contact with one another. However, so far as they are disposed along the propagation path of the light beam, they may be arranged separately from one another, with each set of members consisting of a single member or a plurality of members aligned with one another. If the polarizer 81 and the analyzer 82 are to be dispensed with, polarization modulation or phase modulation can be performed in place of amplitude modulation. Since the input and output surfaces of the focusing light guide pieces and the crystals lie in the planes perpendicular to the direction of the propagation of the light beam, they can be put together by the use of an optical binding agent. Furthermore, an electrooptic substance such as the recently developed ferroelectric transparent ceramics can be used instead of the electrooptic crystals.

As described above in detail, the present invention provides a stable and small-sized optical modulator capable of high-sensitivity and wide-band optical modulation.

The above-described arrangement is merely illustrative of the principles of the present invention. Numerous modifications and adaptations thereof will be readily apparent to those skilled in the art without departing from the spirit and scope of the present invention.

What is claimed is:

1. An optical modulator comprising a plurality of electrooptic crystals arranged in an array along a propagating direction of a coherent light beam, each of said crystals having end surfaces perpendicular to said light beam propagating direction; at least one transparent light guide focusing means disposed between adjacent ones of said electrooptic crystals, said light guide focusing means including a center axis aligned with the direction of propagation and end surfaces perpendicular to said center axis, contiguous end surfaces of said light guide focusing means and said electrooptic crystals being maintained in contact, said light guide means having a refractive index gradually decreasing from its center axis towards the periphery thereof; means for applying a modulating signal voltage to each of said electrooptic crystals; means for linearly polarizing said coherent light beam at the input of said modulator; and means for analyzing said coherent light beam at the output of said modulator; whereby the intensity of the light rays is modulated in response to said modulating signal when viewed at the output of said modulator.

* * * * *